United States Patent
Kallin et al.

(10) Patent No.: US 9,161,283 B2
(45) Date of Patent: Oct. 13, 2015

(54) METHOD OF HANDOVER IN A CELLULAR RADIO NETWORK

(75) Inventors: Harald Kallin, Sollentuna (SE); Birgitta Olin, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 13/990,734

(22) PCT Filed: Dec. 7, 2010

(86) PCT No.: PCT/SE2010/051348
§ 371 (c)(1),
(2), (4) Date: Sep. 11, 2013

(87) PCT Pub. No.: WO2012/078083
PCT Pub. Date: Jun. 14, 2012

(65) Prior Publication Data
US 2013/0344871 A1    Dec. 26, 2013

(51) Int. Cl.
*H04W 36/00* (2009.01)
*H04W 36/30* (2009.01)
*H04W 36/38* (2009.01)

(52) U.S. Cl.
CPC .............. *H04W 36/30* (2013.01); *H04W 36/38* (2013.01)

(58) Field of Classification Search
CPC ..... H04L 67/02; H04W 64/006; H04W 36/32
USPC ......... 455/436, 437, 438, 439, 440, 441, 442, 455/443, 444, 445, 446
See application file for complete search history.

(56) References Cited

U.S. PATENT DOCUMENTS

| | | | |
|---|---|---|---|
| 5,946,621 | A | 8/1999 | Chheda et al. |
| 5,991,626 | A | 11/1999 | Hinz et al. |
| 6,466,797 | B1 | 10/2002 | Frodigh et al. |
| 6,937,866 | B2 | 8/2005 | Duffett-Smith et al. |

(Continued)

FOREIGN PATENT DOCUMENTS

| | | |
|---|---|---|
| WO | WO 2009/123512 A1 | 10/2009 |
| WO | WO 2010/121418 A1 | 10/2010 |

OTHER PUBLICATIONS

International Search Report, Application No. PCT/SE2010/051348, Sep. 6, 2011.

(Continued)

*Primary Examiner* — Vladimir Magloire
*Assistant Examiner* — Sayed T Zewari
(74) *Attorney, Agent, or Firm* — Myers Bigel Sibley & Sajovec, P.A.

(57) ABSTRACT

A method in a radio network node (105) for handling handover of a user equipment (110) from a first cell (115) to a second cell (120) is provided. A first scenario (410, 510), associated with a radio quality of the first cell (115) and a radio quality of the second cell (120), and a second scenario (420, 520), associated with a radio quality of the first cell (115) and a radio quality of the second cell (120), are defined. Also defined is at least one individual handover parameter (210, 220) for each one of the scenarios. Measured radio qualities of the first and second cells, associated with the user equipment (110) are obtained. The user equipment (110) is then classified into one of the scenarios based on the measured radio qualities, and a handover decision is established based on the individual handover parameter (210, 220) for the chosen scenario.

14 Claims, 6 Drawing Sheets

(56) References Cited

U.S. PATENT DOCUMENTS

| | | | |
|---|---|---|---|
| 2004/0266434 A1* | 12/2004 | Lehtinen et al. | 455/436 |
| 2006/0229087 A1 | 10/2006 | Davis, III et al. | |
| 2007/0281712 A1* | 12/2007 | Povey et al. | 455/456.1 |
| 2008/0070576 A1 | 3/2008 | Sanders et al. | |
| 2010/0298001 A1* | 11/2010 | Dimou et al. | 455/441 |

OTHER PUBLICATIONS

Written Opinion of the International Searching Authority, Application No. PCT/SE2010/051348, Sep. 6, 2011.

International Preliminary Report on Patentability, Application No. PCT/SE2010/051348, Mar. 4, 2013.

* cited by examiner

METHOD OF HANDOVER IN A CELLULAR RADIO NETWORK

CROSS REFERENCE TO RELATED APPLICATION

This application is a 35 U.S.C. §371 national stage application of PCT International Application No. PCT/SE2010/051348, filed on 7 Dec. 2010, the disclosure and content of which is incorporated by reference herein in its entirety. The above-referenced PCT International Application was published in the English language as International Publication No. WO 2012/078083 A1 on 14 Jun. 2012.

TECHNICAL FIELD

Embodiments herein relate to a radio network node and a method in a radio network node. In particular, it relates to handling handover of a user equipment from a first cell to a second cell.

BACKGROUND

In a typical cellular radio system, also referred to as a wireless communication system, user equipments, also known as mobile terminals and/or wireless terminals, communicate via a Radio Access Network (RAN) to one or more core networks. The user equipments may be mobile stations or user equipment units such as mobile telephones also known as "cellular" telephones, and laptops with wireless capability, and thus may be, for example, portable, pocket, hand-held, computer-included, or car-mounted mobile devices which communicate voice and/or data with the radio access network. The user equipment may also be referred to as a terminal or a UE.

The radio access network covers a geographical area which is divided into cell areas, with each cell area being served by a base station, e.g., a Radio Base Station (RBS), which in some networks is also called "eNB", "eNodeB", "NodeB" or "B node" and which in this document also is referred to as a base station. A cell is a geographical area where radio coverage is provided by the radio base station equipment at a base station site. The base stations communicate over the air interface operating on radio frequencies with the user equipment units within range of the base stations.

In some versions of the radio access network, several base stations are typically connected, e.g. by landlines or radio link, to a Radio Network Controller (RNC). The radio network controller, also sometimes termed a Base Station Controller (BSC), supervises and coordinates various activities of the plural base stations connected thereto. The radio network controllers are typically connected to one or more core networks.

To support mobility of user equipments between cells, a cellular radio system must perform so called handovers. A handover is a change of serving cell, so that a user equipment being served by one cell becomes served by another cell instead. Handover may be necessary for example when a user equipment such as a mobile telephone moves from one serving cell into another, otherwise an ongoing call might be dropped due to loss of radio coverage. The decision of when a user equipment shall change to be served by another target cell is called a handover decision, and is often decided by the serving base station or another radio network node.

Handover decisions are based on measurement reports, provided to the cellular radio system by the user equipment itself, or by other base stations or nodes in the cellular radio system. For this purpose, user equipments may regularly perform measurements on signals originating both from the currently serving cell, and from surrounding cells. Each cell is identified by an individual so called identification code. The measured quantities may be for example received signal strength (RSS), signal to noise ratio (SNR), or bit error rate (BER). When the measurements indicate that a cell other than the currently serving cell would provide a better connection for a user equipment, a handover decision may be made.

To account for measurement uncertainties, and to avoid interruption of service, the cellular radio system typically has preset handover parameters to control handovers. Usually, before a handover decision is established, it is required that the measurements indicate that the measured quantity of the target cell is a certain amount better relative to the current serving cell, the so called "handover margin", for a certain period of time, the so called "time to trigger".

A tuning of handover parameters, such as the handover margin and the time to trigger, typically has an inherent tradeoff. Too small values might cause numerous switching between two cells, resulting in a user equipment being handed over back and forth from one cell to another. This may increase the system load and even if each handover only poses a minor risk for the connection due to signaling errors, the connection is exposed to an unnecessary risk if an excessive number of handovers is made. Conversely, too high values might also lead to a dropped call, since the handover decision might come too late.

To facilitate the handling of handovers, so called Neighbor Cell Relations (NCR) have been introduced.

In older wireless communication system revisions such as analog networks, GSM or UMTS, it is normally predetermined for each cell which neighbor cell relations can be established, whereas in newer wireless communication system revisions such as LTE—Long Term Evolution, a neighbor cell relation may be automatically established with any identified cell.

Adding to the difficulties in setting satisfactory handover parameters in a cellular radio system, is the fact that radio coverage of a cell is influenced by the surroundings, such as the topography of the terrain and buildings. Moreover, all base stations in a network may not be placed for optimum performance due to natural and enforced limitations. This results in most cellular systems having a "patchy" cell configuration with irregular cell borders and coverage islands of one cell inside another cell. This results in varying radio coverage conditions, for which the handover parameters may not always result in desired quality of handover service.

In an attempt to alleviate problems due to troublesome handovers, measurements may be performed manually, and some cell relations may be manually prohibited, or the handover parameters for a specific cell relation may be tuned to encourage or discourage handover.

Moreover, as networks become large, the number of cells and cell relations grow rapidly. The operators therefore demand a higher degree of automation, and so called Self Organizing Networks (SONs) are requested.

With a higher degree of automation in the wireless networks, neighbor cell relations might, as mentioned above, be added automatically by the network itself. Although this may be a desired property, it may also lead to neighbor cell relations being added that sometimes exhibit undesirable properties and lead to poor quality of service. The above stated problems associated with handovers may indeed be relevant for both older and newer wireless communication systems.

SUMMARY

In view of the discussion above, it is an object for embodiments herein to provide an improved way of handling handover.

According to a first aspect, the object is achieved by a method in a radio network node for handling handover of a first user equipment from a first cell to a second cell. The first cell, second cell and the radio network node are comprised in a wireless communication system. The radio network node defines a first scenario associated with a first radio quality of the first cell and with a second radio quality of the second cell. The radio network node also defines a second scenario associated with a third radio quality of the first cell and with a fourth radio quality of the second cell. At least one individual handover parameter is then defined for each one of the respective first scenario and second scenario. A measurement report is obtained comprising a first measured radio quality of the first cell and a second measured radio quality of the second cell, which first measured radio quality and second measured radio quality are associated with the first user equipment. The radio network node also classifies the first user equipment into one of the first scenario or the second scenario based on the first measured radio quality and the second measured radio quality. The handover decision is then established based on the at least one individual handover parameter defined for the scenario into which the first user equipment is classified.

According to second aspect, the object is achieved by a radio network node for handling handover of a first user equipment from a first cell to a second cell. The first cell, second cell and the radio network node are comprised in a wireless communication system. The radio network node comprises a processor. The processor comprises a defining unit configured to define a first scenario associated with a first radio quality of the first cell and with a second radio quality of the second cell. The defining unit is further configured to define a second scenario associated with a third radio quality of the first cell and with a fourth radio quality of the second cell. The defining unit is further configured to define at least one individual handover parameter for each one of the respective first scenario and second scenario. The radio network node further comprises a receiver configured to obtain a measurement report comprising a first measured radio quality of the first cell and a second measured radio quality of the second cell, which first measured radio quality and second measured radio quality are associated with the first user equipment. The processor further comprises a classification unit configured to classify the first user equipment into one of the first scenario or the second scenario based on the first measured radio quality and the second measured radio quality. The processor further comprises a decision unit configured to establish a handover decision based on the at least one individual handover parameter defined for the scenario.

By defining different scenarios and classifying the user equipment into one of these at a handover situation, it is possible to individually adapt handover parameters for several different cell crossing passages within the same cell relation, such as e.g. for different routes between a first cell and a second cell.

Therefore, an improved way of handling handover is provided.

Embodiments herein are based on the understanding that each user equipment experiencing a specific cell relation may move along different routes, and that recognizing these as separate handover situations, requiring unique handover parameters, provides for solving or at least alleviating some of the aforementioned problems.

This has many advantages. For example, it makes it possible to solve situations where a neighbor cell relation sometimes is legitimate and certainly required, and sometimes should be avoided.

A further advantage of embodiments herein, is that they allow for improved overall auto-tuning possibilities.

Other objects, advantages and novel features of embodiments herein will become apparent from the following detailed description when considered in conjunction with the accompanying drawings and claims.

DETAILED DESCRIPTION

Embodiments herein may be exemplified in the following non-limiting detailed description.

Figure 1:
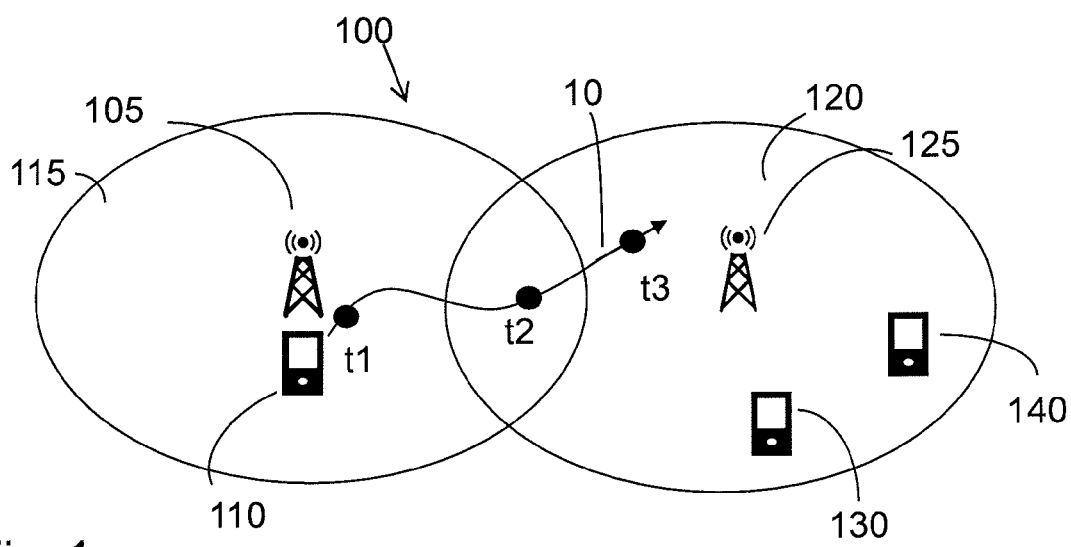
FIG. 1 is a schematic block diagram illustrating embodiments of a wireless communication system.

FIG. 1 depicts a wireless communication system 100. The wireless communication system 100 may be an LTE communication system, a WCDMA communication system, a GSM communication system, or any other cellular wireless communication system.

The wireless communication system 100 comprises a radio network node 105 serving a first cell 115. The wireless communication system 100 further comprises a second radio network node 125, serving a second cell 120.

The first radio network node 105 and the second radio network node 125 may be an eNodeB, a Radio Base Station (RBS), a radio network controller (RNC), or any other suitable radio network node.

In some embodiments, the first cell 115 and the second cell 120 may be served by the same radio network node, for example the first radio network node 105. This may be the case for example if the first radio network node 105 has more than one antenna lobes, in which case each lobe may form a cell.

A cell is a geographical area where radio coverage is provided by a radio base station equipment, via the antenna lobe, at a base station site. The radio network nodes 105, 125 serve the user equipments within their respective cell by communicating with them over the air interface.

A first user equipment 110 is depicted situated in the first cell 115, and is thus served by the first radio network node 105, i.e. may communicate with the first radio network node over a radio link. A second user equipment 130 and a third user equipment 140 are depicted situated in the second cell 120. These user equipments 130, 140 are thus served by the second radio network node 125.

The user equipments 110, 130 and 140 may be mobile stations or user equipment units such as mobile telephones also known as "cellular" telephones, and laptops with wireless capability, and thus may be, for example, portable, pocket, hand-held, computer-included, or car-mounted mobile devices which communicate voice and/or data with the wireless communication system 100.

FIG. 1 further illustrates a possible handover situation. The user equipment 110 may move from the first cell 115 to the second cell 120. Such a movement may for example be along a moving path corresponding to arrow 10.

In the example illustrated in FIG. 1, the user equipment 110 starts moving at time t1. The user equipment 110 is at this time t1 well within the first cell 105, and served by the first radio network node 105. At time t2, the user equipment 110 has reached an area covered by both the first cell 115 and the second cell 120. At time t3, the user equipment 110 is well within the second cell 120, in an area served only by the second radio network node 125. Hence, as the user equipment 110 moves along a route corresponding to arrow 10, a handover must take place, so that the user equipment 110 switches to be served by the second cell 120 instead of the first cell 115.

A handover is typically considered only when a neighboring cell provides better communication than the currently serving cell. Therefore, in the wireless communication system 100, measurements are regularly performed to find out which cell may provide the best radio coverage for the user equipment 110. The measurements are obtained by the radio network node 105 in a measurement report. The measurement report may be obtained from the user equipment 110 itself, from the radio network node 105 itself, or from any other suitable node capable of performing relevant measurements and/or providing such a measurement report.

Based on the measurement report, a handover decision may be established by comparing the measured radio qualities to one or more handover parameters. Commonly used handover parameters are the so called "time to trigger" and "handover margin", also previously briefly discussed in the background. The measured radio qualities may be any suitable radio quality, such as signal strength, signal to noise ratio, etc.

Figure 2:
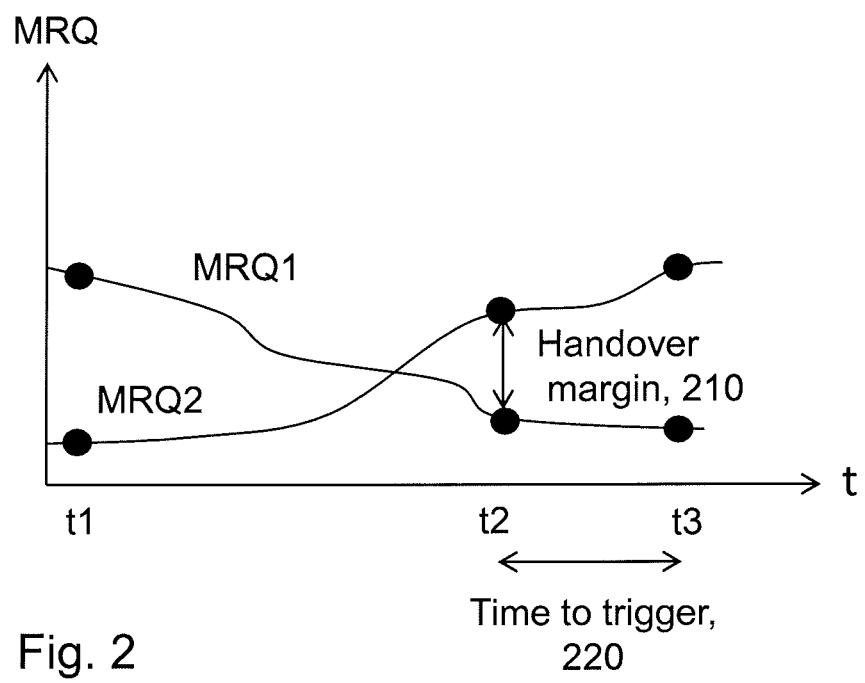
FIG. 2 is a schematic graph illustrating measured radio quality (MRQ) for two respective cells, associated with a user equipment depicted in FIG. 1.

FIG. 2 is a general illustration, relating to the handover situation depicted in FIG. 1, of how handover parameters may be used in the comparison of a measured radio quality (MRQ1) of the first cell 115 and the measured radio quality (MRQ2) of the second cell 120. In this example, as illustrated and explained previously in relation to FIG. 1, the user equipment 110 is at time t1 located well within the first cell 115, but approaching the second cell 120. The measured radio quality (MRQ2) of the second cell 120 is hence at time t1 much worse than the radio quality (MRQ1) of the first cell 115. At time t2, the user equipment 110 has entered an area covered by both the first cell 115 and the second cell 120. At this point, the radio quality (MRQ2) from the second cell 120 is better, and exceeds the handover margin 210. This may for example trigger a timer to start. When such a timer exceeds the time to trigger parameter 220, for example at time t3, a handover decision may be established.

To facilitate handover, so called neighbour cell relations are established. Traditionally, these neighbor cell relations are determined from radio propagation prediction tools, or determined from drive tests conducted by the operator. Alternatively, the neighbor cell relations may be added automatically based on measurements received from the user equipments. These neighbor cell relations enables the currently serving cell to relate measurements to handover parameters that are unique for the cell relation. The comparison may be performed pairwise for the serving cell and a candidate cell where the difference in measured radio quality is compared.

Figure 3:
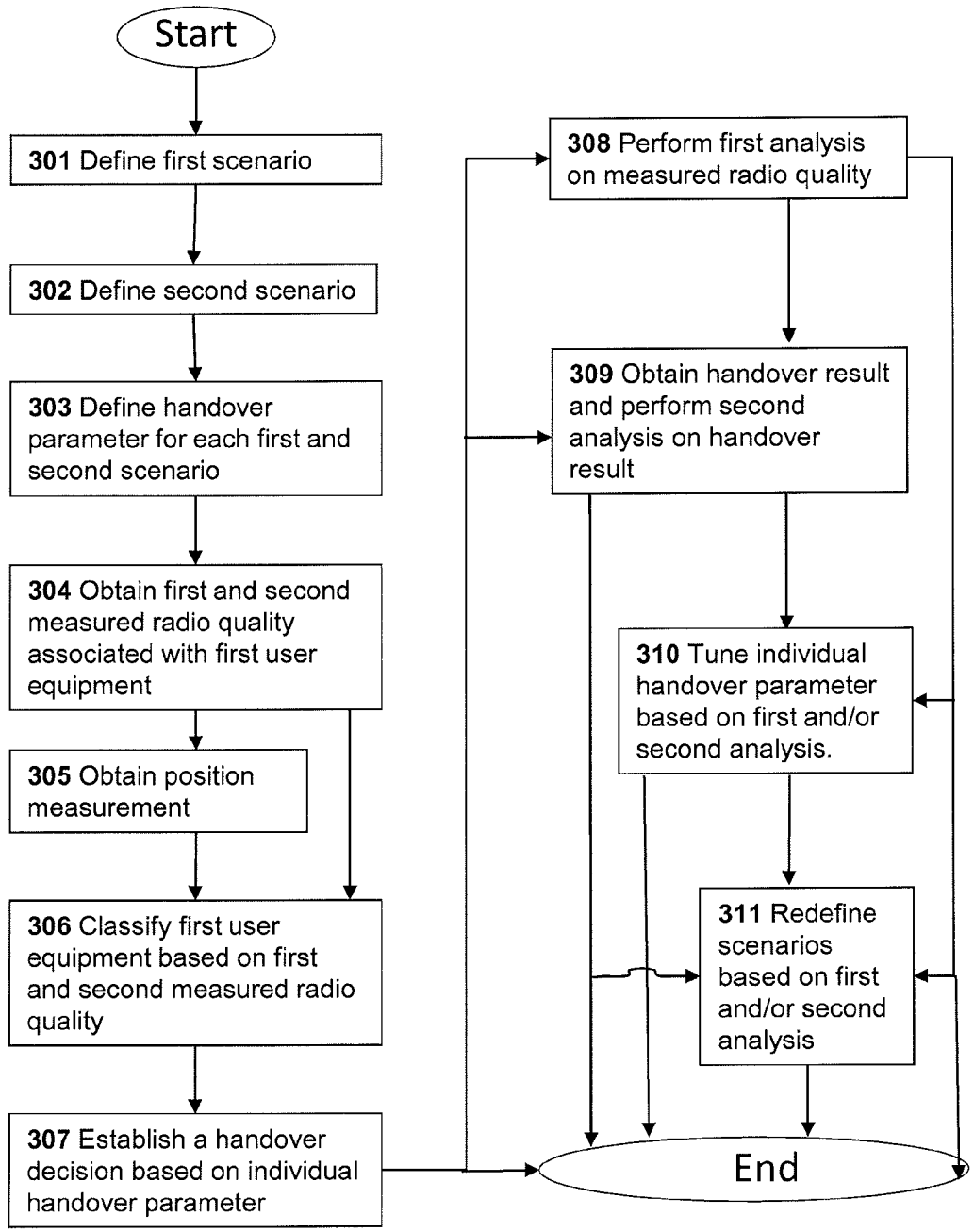
FIG. 3 is a flowchart depicting embodiments of a method in a radio network node.

Embodiments herein, relating to a method in the radio network node 105 for handling handover of the first user equipment 110 from the first cell 115 to the second cell 120 will now be described with reference to the flowchart depicted in FIG. 3. As mentioned above, the first cell 115, second cell 120 and radio network node 105 are comprised in the wireless communication system 100.

The method according to embodiments herein comprises the following steps, which steps may as well be carried out in another suitable order than described below.

Step 301

The radio network node 105 defines a first scenario 410 associated with a first radio quality of the first cell 115 and with a second radio quality of the second cell 120.

Step 302

The radio network node also defines a second scenario 420 associated with a third radio quality of the first cell 115 and with a fourth radio quality of the second cell 120.

A scenario, being a combination of radio qualities, may be defined as a region with arbitrary borders and/or as a centre point in a signal quality space.

For example, the term scenario may be described with reference to FIG. 4. This figure shows a two dimensional graph, where the vertical axis corresponds to radio quality of the first cell and the horizontal axis corresponds to radio quality of the second cell. The radio quality may be for example signal strength.

The first scenario 410 and the second scenario 420 may be defined as points, or as regions with arbitrary borders. In FIG. 4, the first scenario 410 and the second scenario 420, are defined as points. Dashed line 41 shows an example of where a border between the first scenario 410 and the second scenario 420 may be drawn if the first scenario 410 and the second scenario where defined as regions.

Figure 4:
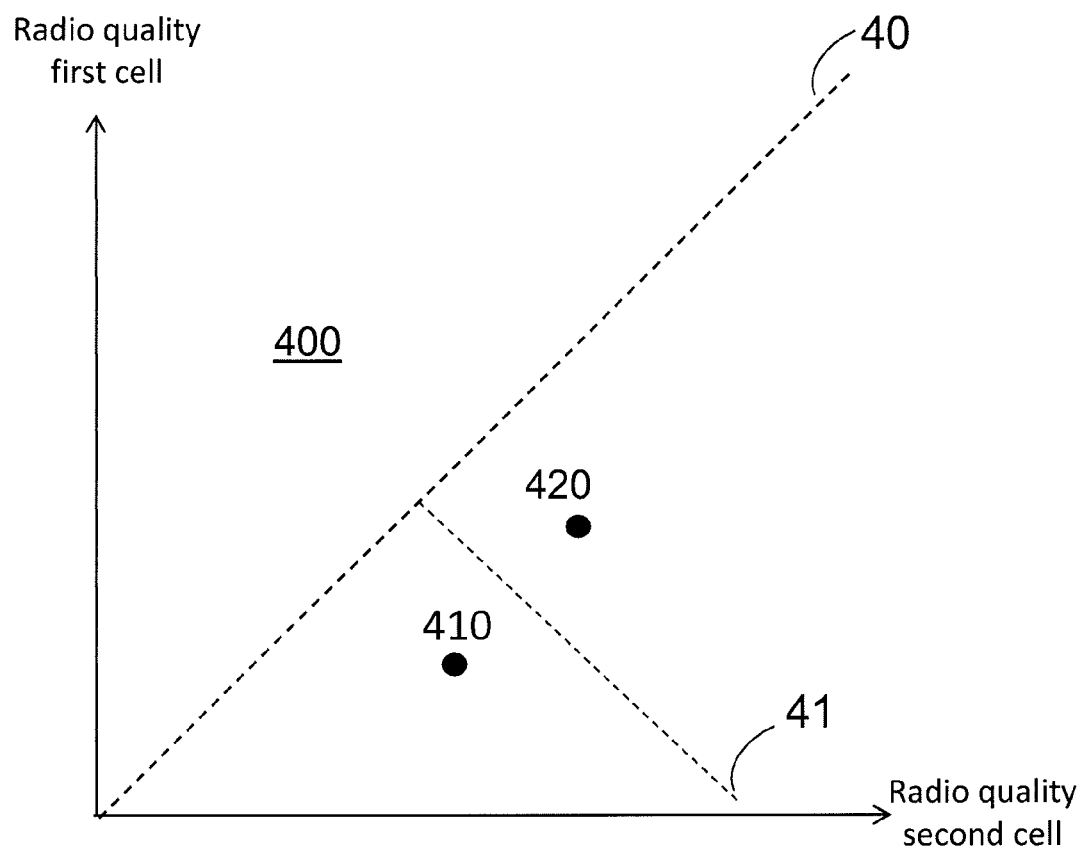
FIG. 4 is a schematic graph illustrating an embodiment of two scenarios.

As can be seen in the example illustrated in FIG. 4, the first scenario 410 and second scenario 420 may be defined in the region where the radio quality of the second cell is better than the first cell. This may be representative for a situation when handover from the first cell to the second cell is considered. In the region 400, between the vertical axis and the diagonal dashed line 40, the radio quality of the first cell is better than the radio quality of the second cell, and handover may normally not be considered.

In some embodiments, one or more scenarios may, however, be defined in the region 400, for example fore load balancing purposes or if early handover is necessary for good quality of service.

Figure 5:
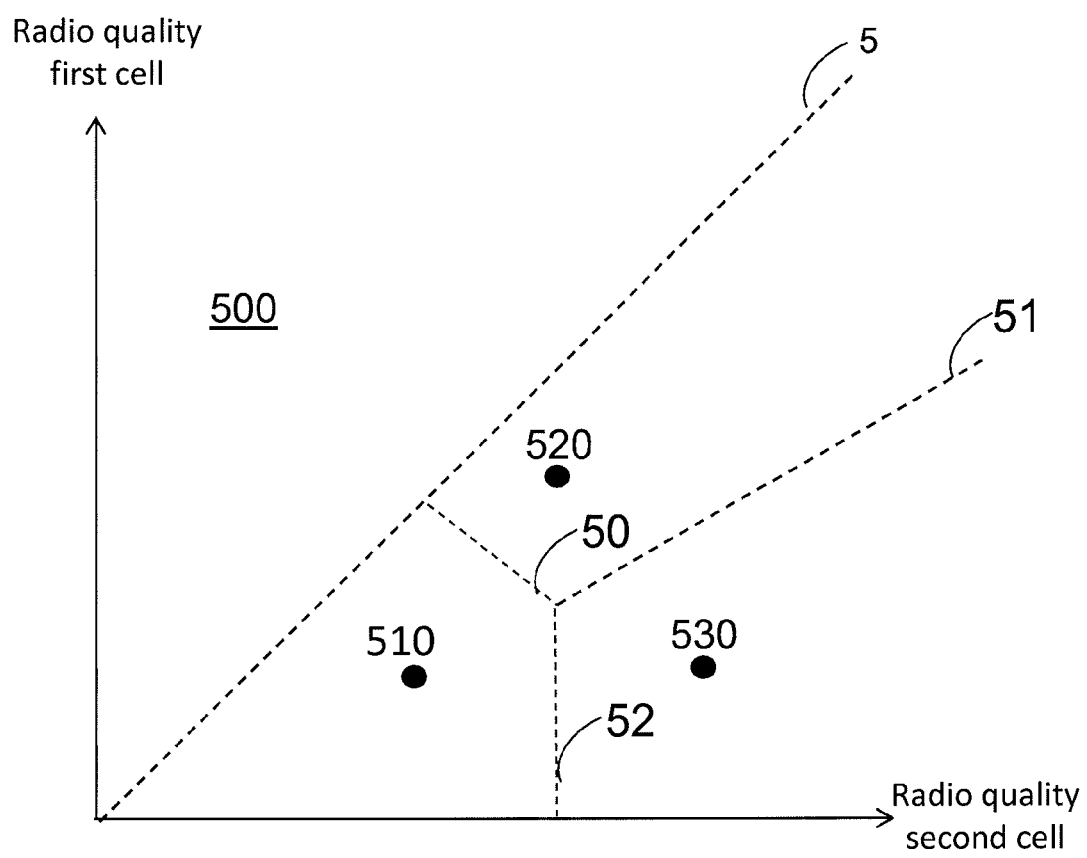
FIG. 5 is a schematic graph illustrating an embodiment with three scenarios.

Some embodiments comprise more than two scenarios. In FIG. 5, an example is illustrated where there are three scenarios, 510, 520 and 530. As in FIG. 4, the scenarios in FIG. 5 are defined in the region where the radio quality of the second cell is better than the radio quality of the first cell, this being a region where handover from the first cell to the second cell may normally be considered. In the region 500, between the vertical axis and the diagonal dashed line 5, the radio quality of the first cell is better than the radio quality of the second cell, and handover may normally not be considered.

In FIG. 5, the scenarios 510, 520 and 530 are defined as points. Dashed lines 50, 51, 52 show examples of where borders between the scenarios may be drawn if the scenarios where defined as regions.

A radio quality may be defined as one or more radio qualities, such as for example signal strength in uplink, signal strength in downlink, signal to noise ratio, signal to interference ratio, frame error rate or bit error rate, etc.

In general, each cell may have one or more radio qualities associated with one or more scenarios. For example, if a scenario is defined by signal strength and bit error rate for both a serving cell and a candidate cell, a four-dimensional scenario is obtained. A scenario may also be defined as a combination of radio qualities from more than two cells, leading to high-dimensional scenarios.

One or more scenarios may be represented by a center point.

Step 303

The radio network node 105 also defines at least one individual handover parameter 210, 220, see for example FIG. 2, for each one of the respective first scenario 410 and second scenario 420.

The individual handover parameters may be for example the "time to trigger" or the "handover margin", as described earlier with reference to FIG. 2. The "handover margin" may be constructed from, or replaced by, various other parameters, for example "handover offset" and "handover hysteresis", that all are different ways of expressing a desired difference in received signal strength. Yet other parameters that may be used as handover parameters are other quality estimates or the measured path loss between the user equipment and neighboring cells.

Step 304

The radio network node 105 obtains a measurement report comprising a first measured radio quality of the first cell 115 and a second measured radio quality of the second cell 120, which first measured radio quality and second measured radio quality are associated with the first user equipment 110.

The measurement report associated with the first user equipment 110 may be obtained from the first user equipment 110 itself, from the first radio network node 105, or from another radio network node, such as the second radio network node 125, or from another user equipment or a combination of several user equipments and/or radio network nodes.

Step 305

The radio network node 105 may also, in some embodiments, obtain a position measurement associated with the first user equipment 110.

Such position measurements may originate from satellite based positioning techniques, such as a global navigation satellite system (GNSS) e.g. the global positioning system (GPS). Techniques based on time difference of arrival (TDOA) may also be used.

Step 306

The radio network node 105 classifies the first user equipment 110 into one of the first scenario 410 or the second scenario 420 based on the first measured radio quality and the second measured radio quality. Referring again to FIG. 4, this may correspond to choosing which scenario 410 and 420 best maps to the measured radio qualities associated with the user equipment 110.

The classification may be based on the closest point, "nearest center", in this high-dimensional or, as in FIGS. 4 and 5, at least two-dimensional, space from a measured radio quality and the center point of the scenario. What is meant with the closest point may be defined using any suitable vector norm.

If the radio network node 105 obtains a position measurement associated with the first user equipment 110 as described above in relation to the optional step 305, the classification may further be based on the obtained position measurement.

The classification may be improved by further basing the classification of a user equipment on a position measurement.

Step 307

The radio network node 105 then establishes a handover decision based on the at least one individual handover parameter 210, 220 defined for the scenario into which the first user equipment 110 is classified.

The radio qualities used to classify the user equipment into a scenario need not be the same as the radio qualities compared to the handover parameters in establishing the handover decision.

Step 308

According to some embodiments herein, the radio network node 105 may obtain a third measured radio quality associated with a second user equipment 130 within the wireless communication system 100. The radio network node 105 may then perform a first analysis of said first measured radio quality, said second measured radio quality and/or said third measured radio quality.

Hence, over a time interval, an analysis of all or a subset of the reported measurements of measured radio quality may be applied. This analysis may reveal clusters, or "hot spots", where many user equipments have been located. For example, if there is a major artery, such as a big road, crossing the cell border, a vast majority of the user equipments measurement reports may be similar. It is then possible to cluster these to be significant lump of crossing users. This may be useful for example in choosing where to define scenarios.

Step 309

In some embodiments, the radio network node 105 may obtain a first handover result associated with the first user equipment 110 and a second handover result associated with the third user equipment 140 within the wireless communication system 100. The radio network node 105 may then perform a second analysis of said first handover result and/or said second handover result.

The handover result may be classified as a successful handover, or a failed handover, for example if the handover succeeded but shortly afterwards the signal quality deteriorated rapidly or the call dropped. Conversely, if a handover is not issued and a problem in the communication link occurs, then such a handover result may also contain valuable information.

A handover result may be evaluated by the radio network node 105 or the user equipment 110 after some time. A successful handover may also be reported as a handover result.

When more than one handover result becomes available, a more detailed and informative analysis may be performed. For instance, all or a subset of all handovers from one scenario may be analysed to evaluate the performance of the handover parameters defined in this scenario. A statistical analysis may be applied, where the average handover result for each scenario is monitored together with its standard deviation. Optimization based methods, such as clustering and classification algorithms, may be used to analyse the handover results. Advantages of such an analysis may include finding relations between handover parameters and handover results.

The first and the second analysis may be a combined analysis, which may include a statistical analysis, and/or an optimisation.

Step 310

According to some embodiments, the radio network node 105 may tune one or more of the at least one individual handover parameter 210, 220 based on the first analysis and/or the second analysis.

The handover results may be used to tune the handover parameters. This tuning may be applied occasionally, or on demand. For example, if several cases of dropped calls can be associated with a certain scenario, one or both of the handover margin and time to trigger, or other suitable handover parameters, may be tuned by increasing them. Conversely, if the handovers from one cell to another are always successful in one of the scenarios, one or more handover parameters may be decreased somewhat to allow for a quicker handover.

It is also possible to add extra delays or handover margins to delay or stop handovers from taking place if the conditions are known to result in very poor service performance, such as handover failure or dropped calls shortly after a handover.

According to some embodiments, the tuning may be performed adaptively.

If handover parameters are redefined at regular time intervals, an adaptive algorithm may be obtained. Such an adaptive algorithm may automatically tune the handover parameters based on the first and/or the second analysis. This may address the needs from the operators on the demand on a higher degree of automation, where so called Self Organizing Networks (SONs) are requested.

Adaptive algorithms may operate on one or more handover parameters of one or more scenarios individually, e.g. tuning the handover margin or the time to trigger parameters. Handover parameters may be tuned in one or more dimensions, e.g. for specific cell relations, or for different radio qualities.
Step 311

According to some embodiments, the radio network node may redefine the first scenario 410, 510 and/or the second scenario 420, 520 based on the first analysis and/or the second analysis.

The redefining may be applied occasionally or on demand.

The result of the first analysis may also be used in redefining one or more scenarios. For example, if a major border crossing is identified by measurement reports from several user equipments being similar, this may imply defining or redefining a scenario in this hot spot. Hence, scenarios could adjust their shapes to measured radio qualities.

The result of the second analysis may be used to redefine one or more scenarios. This may involve redefining the center point of one or more scenarios, splitting one or more scenarios into two new ones each defined by new center points, or merging two scenarios into one. If for instance, a number of handover or call failures can be associated with a particular combination of radio quality measures, i.e. with a particular scenario, then a new scenario may be created for this particular combination, with its own handover parameter tuning. In this way, the problem may be mitigated.

A scenario may be redefined as several scenarios, which splits a broad region into smaller regions if the handover performance for the scenario is not satisfactory. Conversely, smaller regions with similar properties may be merged to broader regions, by merging two or more scenarios into one.

By splitting an area into smaller regions, it may be possible to adapt the handover parameters for a certain cell border crossing, that otherwise would have to use a set of handover parameters used for other border crossings. Merging smaller regions to larger may simplify maintenance, due to fewer scenarios, and may increase the accuracy for the parameter tuning, due to more samples per region.

According to some embodiments, the redefining may be performed adaptively. If one or more scenarios are redefined at regular time intervals, an adaptive algorithm may be obtained. An adaptive algorithm may automatically redefine one or more scenarios based on the first and/or the second analysis. Such adaptive redefining may address the needs from the operators on the demand on a higher degree of automation, where so called Self Organizing Networks (SONs) are requested.

Adaptive algorithms may operate on one or more dimensions of one or more scenarios individually; e.g. redefining the scenario in one more dimensions, e.g. for specific cell relations, and for one or more radio qualities. This would correspond to moving, merging, or splitting one or more scenarios in one or more graphs such as those exemplified in FIGS. 4 and 5.

Embodiments herein have several advantages. While each cell relation in a cellular system may be unique and may require a unique parameter setting in order to optimize the relation in terms of mobility handover, load balancing et cetera, embodiments herein take into account that each cell crossing passage from one cell to another is unique and may require unique parameter settings for optimal performance.

There may of course be an infinite number of possible cell border crossings between the first and the second cell, but the number of major border crossings is normally low, hence in some situations, even a couple of scenarios for each cell relation may provide substantial improvements over single parameter sets per cell relation.

By classifying the situation at each handover, it may be possible to maintain, tune and individually adapt several different cell crossing passages from one cell to another, instead of using the same parameters for all handovers experiencing that particular cell relation.

Typically, there are many border crossings possibilities between a pair of cells, e.g. several arteries crossing the border, such as highways, roads and railroads. Moreover, there are different situations for ground traffic and users moving around in and on top of buildings, and patchy cell coverage leading to coverage islands. Hence, each crossing may have its own unique characteristic, with associated demand on treatment in order to ensure good service performance.

Using the above method makes it possible to even completely prevent some handovers from taking place from one cell to another by applying deterrent parameter values.

As an illustrating example of a problematic situation that may be handled by embodiments herein, consider the following: A part of a riverbed is covered by two neighboring cells, cell A and cell B. There is one major road following the riverbed, and therefore the cell relation between the two neighboring cells A and B is certainly needed for good performance. There is also a river crossing on an elevated bridge followed by a tunnel. For user equipments traveling on the river crossing, handover from cell A to cell B results shortly in a lost call when the user equipment enters the tunnel. For the user equipments following the riverbed road, a handover should be performed without any hesitation. For the user equipments on the bridge, a dropped call might be avoided by delaying or forbidding handovers to take place to from cell A to cell B, and instead relying on another cell to provide coverage when entering the tunnel.

According to embodiments herein, by defining a first scenario corresponding to the riverbed route, and a second scenario corresponding to the river crossing route, the situation may be handled.

User equipments that travel on the riverbed route will be classified into the first scenario, where handover parameters may be defined to allow quick handover. User equipments travelling on the river crossing route on the other hand, will be classified into the second scenario, where deterrent handover parameters may be defined that prevent handover.

Hence, by using embodiments herein, it would be possible to both provide good service to user equipments travelling along the riverbed, and to user equipments travelling on the river crossing route.

Another advantage with embodiments herein is that they make use of information about the radio quality of the serving cell and neighboring cells, which information may be easily retrieved from the user equipments existing measurement reports. Since measurement reports form the decision basis for handover in present wireless communication systems, this information may always be present and up to date.

Moreover, embodiments herein may be independent of geopositioning techniques, which techniques may be inaccurate and may require additional functionality.

Figure 6:
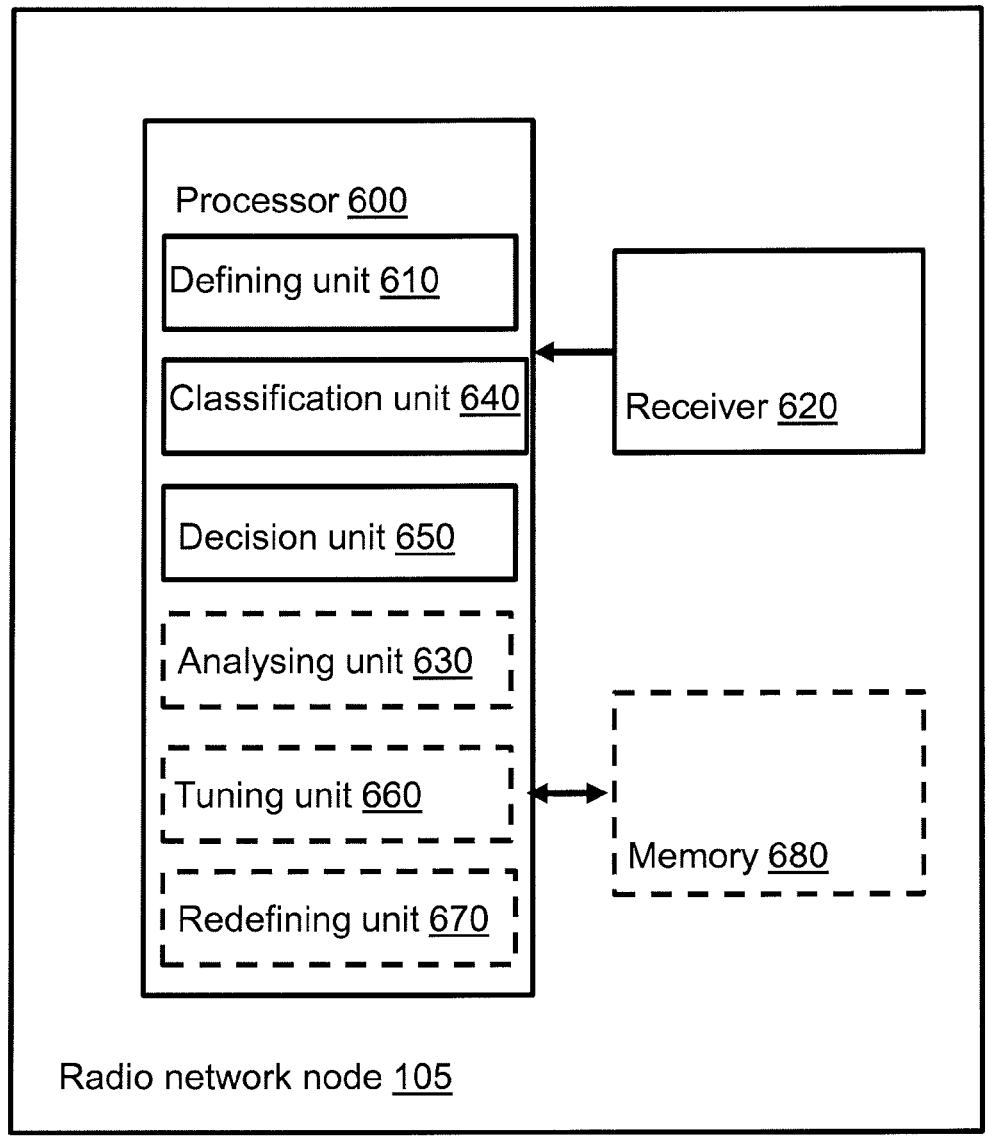
FIG. 6 is a schematic block diagram illustrating embodiments of a radio network node.

Embodiments herein, relating to a radio network node for handling handover of a first user equipment 110 from a first cell 115 to a second cell 120 will now be described with reference to the arrangement schematically depicted in FIG. 6. As mentioned above, the first cell 115, second cell 120 and the radio network node 105 are, as mentioned above, comprised in a wireless communication system 100.

The term "configured to" used herein may also be referred to as "arranged to".

The radio network node 105 comprises a processor 600. The processor 600 comprises a defining unit 610 configured to define a first scenario 410 associated with a first radio quality of the first cell 115 and with a second radio quality of the second cell 120.

The defining unit 610 is further configured to define a second scenario 420 associated with a third radio quality of the first cell 115 and with a fourth radio quality of the second cell 120.

The defining unit 610 is further configured to define at least one individual handover parameter 210, 220 for each one of the respective first scenario 410 and second scenario 420.

The radio network node 105 further comprises a receiver 620 configured to obtain a measurement report comprising a first measured radio quality of the first cell 115 and a second measured radio quality of the second cell 120, which first measured radio quality and second measured radio quality are associated with the first user equipment 110.

According to some embodiments, the receiver 620 may be configured to obtain a third measured radio quality associated with a second user equipment 130, and the radio network node 105 may further comprise an analysing unit 630 configured to perform a first analysis of said first measured radio quality, said second measured radio quality and/or said third measured radio quality.

According to some embodiments, the receiver 620 may further be configured to obtain a first handover result associated with the first user equipment 110 and a second handover result associated with a third user equipment 140 within the wireless communication system 100, and the analysing unit 630 may further be configured to perform a second analysis of said first handover result and/or said second handover result.

The processor 600 further comprises a classification unit 640 configured to classify the first user equipment 110 into one of the first scenario 410 or the second scenario 420 based on the first measured radio quality and the second measured radio quality.

In some embodiments, the receiver 620 may further be configured to obtain a position measurement associated the first user equipment 110. In these embodiments, the classification unit 640 may further be configured to classify said first user equipment 110 into one of the first scenario 410 or the second scenario 420 based on the first measured radio quality, the second measured radio quality and on the obtained position measurement.

The processor 600 further comprises a decision unit 650 configured to establish a handover decision based on the at least one individual handover parameter 210, 220 defined for the scenario into which the first user equipment 110 is classified.

The processor 600 may further comprise a tuning unit 660 configured to tune one or more of the at least one individual handover parameter 210, 220 based on the first analysis and/or second analysis.

The tuning unit 660 may be configured to tune said one or more of the at least one individual handover parameter 210, 220 adaptively.

The processor 600 may further comprise a redefining unit 670 configured to redefine the first scenario 410 and/or the second scenario 420 based on the first analysis and/or second analysis.

The redefining unit 670 may in some embodiments be configured to redefine said first scenario 410 and/or second scenario 420 adaptively.

The term "processor is here to be interpreted broadly. As is readily understood by a person skilled in the art, the various units discussed above may be integrated units, and/or separate units. One or more units may be integrated. The processor may comprise a memory 680, which memory may be used by one or more of the units discussed above.

Apart from the previously mentioned advantages, embodiments herein have additional advantages that will be mentioned in the following.

A wireless cellular system typically comprises a large number of cells. It also takes a large number of parameters to tune and make the system perform in an adequate way. In order to support mobility, but also other features like load balancing, interference coordination et cetera neighbor cell relations, as discussed previously, have been introduced.

In order to have a well working system, some parameters may be set on system level. In many cases however, parameters are set on cell level and in some cases for a specific cell relation.

Handover parameters are traditionally set for all cells, sometimes per cell or, in best case, individually for specific cell relations.

The cell border parameters between two cells that have therefore previously at best been tuned with handover parameters that apply for all border crossings between the two cells, regardless where these crossings occur in the terrain, may, according to embodiments herein, be tuned for individual border crossings separately.

As networks become larger, the number of cells and cell relations grows and the parameters needed for controlling them may explode beyond what the operator is capable of managing. The operators are therefore asking for a higher degree of automation—Self-Organizing Networks (SONs). One of the key areas for radio network optimization is the support of mobility, such as definitions of neighbor cell relations and handover parameters.

Moreover, the task of manually observing and tuning each cell crossing that is in practice impossible in many wireless communication systems, due to the size of the systems and the widespread use of mobile terminals, may now be handled according to embodiments herein of an improved method and arrangement for handling handover.

With a higher degree of automation in the wireless networks, neighbor cell relations will be added automatically by the network itself. Although this may be a desired property, it may also lead to neighbor cell relations being added that sometimes exhibit undesired properties and lead to many dropped calls. If there is no automated protection for avoiding such bad situations, the risk is that the operators will not trust automatic features and will not allow the network to automatically add and maintain neighbor cell relations.

Hence, embodiments herein provides for improved overall auto-tuning possibilities, and may be a useful tool for solving difficult cases where a neighbor relation sometimes is a legitimate and certainly required neighbor and sometimes the relation should be avoided.

Automatic Neighbor Relations

Automatic Neighbor Relations (ANR) are likely to be used in long term evolution (LTE) networks. In such systems, a new neighbor relation may, as mentioned earlier, be created whenever a user equipment detects and reports a neighboring cell. In some cases, that new neighbor cell relation might be useful and necessary, but in other cases a the new relation might be undesired.

Hence, for systems using ANR, some advanced features, such as embodiments herein, might well be needed to handle handover optimization.

Also, in the non-ANR case embodiments herein improves the binary case where a radio engineer can only choose between have a cell relation, or not to have it. According to embodiments herein, new cell relations, also the less obvious ones, may be added.

The embodiments are not limited to the above-described embodiments. Various alternatives, modifications and equivalents may be used.

The invention claimed is:

1. A method in a radio network node for handling handover of a first user equipment from a first cell to a second cell, which first cell, second cell and which radio network node are comprised in a wireless communication system, the method comprising:
   defining a first scenario associated with a first radio quality of the first cell, a second radio quality of the second cell, and a first border crossing between the first and second cells,
   defining a second scenario associated with a third radio quality of the first cell, a fourth radio quality of the second cell, and a second border crossing between the first and second cells,
   defining at least one individual handover parameter for each one of the respective first scenario and second scenario,
   obtaining a measurement report comprising a first measured radio quality of the first cell and a second measured radio quality of the second cell, which first measured radio quality and second measured radio quality are associated with the first user equipment,
   classifying the first user equipment into one of the first scenario or the second scenario based on the first measured radio quality and the second measured radio quality,
   establishing a handover decision based on the at least one individual handover parameter defined for the scenario into which the first user equipment is classified,
      wherein the radio network node has obtained a third measured radio quality associated with a second user equipment within the wireless communication system and/or the radio network node has obtained a first handover result associated with the first user equipment and a second handover result associated with a third user equipment within the wireless communication system,
   the method further comprises:
   performing a first analysis of said first measured radio quality, said second measured radio quality and/or said third measured radio quality, and/or performing a second analysis of said first handover result and/or said second handover result,
   and
   tuning one or more of the at least one individual handover parameter based on the first analysis of said first measured radio quality, said second measured radio quality and/or said third measured radio quality and/or based on the second analysis of said first handover result and/or said second handover result.

2. The method according to claim 1, wherein said tuning is performed adaptively.

3. The method according to claim 1, further comprising:
   redefining the first scenario and/or the second scenario based on the first analysis and/or the second analysis.

4. The method according to claim 3, wherein said redefining is performed adaptively.

5. The method according to claim 1, further comprising:
   obtaining a position measurement associated with the first user equipment and wherein said classifying further is based on the obtained position measurement.

6. A radio network node for handling handover of a first user equipment from a first cell to a second cell, which first cell, second cell and which radio network node are comprised in a wireless communication system, said radio network node comprising a processor, which processor comprises:
   a defining unit configured to define a first scenario associated with a first radio quality of the first cell, a second radio quality of the second cell, and a first border crossing between the first and second cells,
   which defining unit further is configured to define a second scenario associated with a third radio quality of the first cell, a fourth radio quality of the second cell, and a second border crossing between the first and second cells,
   and which defining unit further is configured to define at least one individual handover parameter for each one of the respective first scenario and second scenario,
   the radio network node further comprising
   a receiver configured to obtain a measurement report comprising a first measured radio quality of the first cell and a second measured radio quality of the second cell, which first measured radio quality and second measured radio quality are associated with the first user equipment,
   the processor further comprising
   a classification unit configured to classify the first user equipment into one of the first scenario or the second scenario based on the first measured radio quality and the second measured radio quality,
   the processor further comprising
   a decision unit configured to establish a handover decision based on the at least one individual handover parameter defined for the scenario into which the first user equipment is classified, wherein the receiver is configured to obtain a third measured radio quality associated with a second user equipment and/or configured to obtain a first handover result associated with the first user equipment and a second handover result associated with a third user equipment within the wireless communication system,
   said radio network node further comprising:
   an analysing unit configured to perform a first analysis of said first measured radio quality, said second measured radio quality and/or said third measured radio quality and/or perform a second analysis of said first handover result and/or said second handover result,
   and the processor further comprises:
   a tuning unit configured to tune one or more of the at least one individual handover parameter based on the first analysis of said first measured radio quality, said second measured radio quality and/or said third measured radio quality and/or based on the second analysis of said first handover result and/or said second handover result.

7. The radio network node according to claim 6, wherein said tuning unit is configured to tune said one or more of the at least one individual handover parameter adaptively.

8. The radio network node according to claim 6, wherein the processor further comprises:
   a redefining unit configured to redefine the first scenario and/or the second scenario based on the first analysis and/or second analysis.

9. The radio network node according to claim 8, wherein said redefining unit is configured to redefine said first scenario and/or second scenario adaptively.

10. The radio network node according to claim 6, wherein the receiver further is configured to:
    obtain a position measurement associated the first user equipment and wherein said classification unit further is configured to classify said first user equipment into one of the first scenario or the second scenario based on the first measured radio quality, the second measured radio quality and on the obtained position measurement.

11. The method of claim 1,
    wherein the first and second scenarios correspond to different respective first and second travel routes for user equipment between the first and second cells, and
    wherein defining at least one individual handover parameter for each one of the respective first scenario and second scenario comprises defining different respective handover parameters for the first and second scenarios.

12. The radio network node of claim 6,
    wherein the first and second scenarios correspond to different respective first and second travel routes for user equipment between the first and second cells, and
    wherein the defining unit is configured to define different respective handover parameters for the first and second scenarios.

13. The method of claim 1,
    wherein the first scenario corresponds to a first combination of the first radio quality of the first cell and the second radio quality of the second cell, and
    wherein the second scenario corresponds to a second combination of the third radio quality of the first cell and the fourth radio quality of the second cell.

14. The radio network node of claim 6,
    wherein the first scenario corresponds to a first combination of the first radio quality of the first cell and the second radio quality of the second cell, and
    wherein the second scenario corresponds to a second combination of the third radio quality of the first cell and the fourth radio quality of the second cell.

* * * * *